United States Patent [19]

Long et al.

[11] 4,217,515

[45] Aug. 12, 1980

[54] EMBEDDED FIELD WINDING END TURNS FOR DYNAMOELECTRIC MACHINE ROTORS

[75] Inventors: Lawrence J. Long, Economy Borough, Pa.; Jacques E. Albaric, Fontainebleau, France

[73] Assignee: Westinghouse Electric Corp., Pittsburgh, Pa.

[21] Appl. No.: 877,778

[22] Filed: Feb. 14, 1978

[51] Int. Cl.$^2$ .................................................. H02K 3/46
[52] U.S. Cl. .................................. 310/270; 310/214; 310/260
[58] Field of Search ............... 310/270, 260, 262, 265, 310/219

[56] References Cited

U.S. PATENT DOCUMENTS

| | | | |
|---|---|---|---|
| 964,630 | 7/1910 | Feeney | 310/262 |
| 1,018,531 | 2/1912 | Tingley | 310/262 |
| 1,028,985 | 6/1912 | Behrend | 310/262 |
| 1,238,304 | 8/1917 | Kuyser | 310/214 X |
| 2,594,952 | 4/1952 | Maudi et al. | 310/270 X |
| 2,861,203 | 11/1958 | Luneau et al. | 310/214 X |
| 3,634,709 | 1/1972 | Le Henaff | 310/270 X |
| 3,821,568 | 6/1974 | Gillet | 310/214 X |

Primary Examiner—Donovan F. Duggan
Attorney, Agent, or Firm—J. W. Keen

[57] ABSTRACT

A rotor construction and end turn supporting arrangement for restraining field winding end turns within circumferential slots formed in dynamoelectric machine rotors. Longitudinal slots axially disposed along the rotor intersect the circumferential slots and provide an open-faced housing for disposal therein of the field winding between the axially separated circumferential slots. Wedges are provided for insertion in at least some of the slots for retention therein of the field winding during high-speed rotor rotation. Utilizing electrically conductive wedges in both the longitudinal slots and circumferential slots establishes a rotor cage for carrying undesired eddy currents which are often induced in the rotor material.

11 Claims, 7 Drawing Figures

EMBEDDED FIELD WINDING END TURNS FOR DYNAMOELECTRIC MACHINE ROTORS

BACKGROUND OF THE INVENTION

1. Field of the Invention

This invention relates to the field windings of dynamoelectric machines, and more particularly, to means for embedding the end turns of such field winding in the dynamoelectric machines rotor and restraining such winding in the rotor by use of wedges.

2. Description of the Prior Art

Conventional dynamoelectric machine rotor construction provided for distributing a field winding associated with such rotor within longitudinally-extending slots formed on the outer periphery of the rotor. The field winding portions situated in the longitudinally-extending slots were often restrained therein by means of retainer wedge bars which, when inserted in the longitudinal slots, closed the mouth of the longitudinal slots with the wedge bars often being held in place by means of a dovetail or tapered construction which mated with the walls of the longitudinal rotor slots.

At each axial end of the rotor, the field winding exited the longitudinal slots and passed circumferentially along the periphery of the rotor until the appropriate longitudinal slot was intersected. At such time, the field winding was directed into an appropriate longitudinal slot located on the opposite circumferential side of the rotor pole being wound. Such winding process was continued with the longitudinal slots circumferentially nearer the rotor pole being filled prior to winding the outer longitudinal slots situated about the pole. Thus, for each complete winding pass around each of the rotor poles, the field winding was deformed on each axial end to make the turn-arounds to the return longitudinal slot. Such turn-arounds are known as field winding end turns and were not typically supported by conventional retainer wedge bars. However, due to the high centrifugal forces exerted on the field winding end turns during rotor rotation a constraining device called a retaining ring or retaining sleeve was often utilized. The retaining ring was frequently heated and then shrunk into place on each axial end of the rotor about the radial periphery of the end turns. As generator ratings have increased in recent years, so have generator rotor diameters and strength requirements of the associated retaining rings. Retaining ring strength was often enhanced by increasing its outside diameter since its inside diameter was dependent on rotor diameter. As the outside radial dimension of the retaining ring increased, so did the self-induced centrifugal forces acting thereon. Thus, increasing the radial thickness of retaining rings results in an interaction between opposing effects: augmentation of retaining ring strength due to an increase in its cross-sectional, stressed area and reduction of its strength due to the increase in centrifugal forces exerted thereon.

The outside diameter of such retaining ring or sleeve structures now constitute a serious limitation to further increases in rotor diameter size. Such increases in rotor diameter size are necessary for developing machines of increased ratings. New developments of high-strength materials may permit an increase in retaining ring outside diameter and thus rotor size, but such developments are speculative and unpredictable and, thus, cannot be relied upon to provide retaining rings which permit future, significant increases in dynamoelectric machine ratings.

U.S. Pat. No. 3,634,709, which issued Jan. 11, 1972, illustrates one approach for eliminating the retainer ring. The end turn portions of the field winding are embedded in circumferential slots formed in the rotor and are restrained therein by a double layer helical wire winding applied circumferentially about longitudinally disposed wedges which, on their radially inner side, contact the end turn portions. Utilizing such wire wrapping requires formation of longitudinal wedges whose axial end regions are of complex shape which can be costly to manufacture and difficult to assemble. Furthermore, the aforementioned patent requires additional plates be assembled with the longitudinal wedges to lock the wire wrapping in place. French Pat. No. 2,145,103 illustrates a cryogenic alternator having a continuous slot disposed about each rotor pole. Due to the slot's continuous, non-intersecting character, retainer bars must be welded therein rather than hermetically inserted to restrain the rotor's field windings. Such continuous slots were judged to be difficult to manufacture and not amenable to mechanical insertion of wedges therein for restraining field windings disposed within those slots. Thus, although the prior art avoids some of the problems presented by retaining rings, it introduces others.

SUMMARY OF THE INVENTION

In accordance with the present invention, an improved dynamoelectric machine rotor structure is provided for receiving the field winding on the rotor and utilizing the field developed by the field winding's end turns for additional voltage production which permits upgrading the dynamoelectric machine's rating. The invention generally comprises a rotor which has longitudinal slots and circumferential slots intersecting therewith for reception therein of the rotor's field winding and wedge means. Such wedge means are mechanically insertable into predetermined slots which, when assembled, restrain the field winding within the slots.

In a preferred embodiment of the invention, the circumferential and longitudinal slots cooperate in pairs of each to form a concentric series of intersecting slot groups about each pole region on the rotor. Each slot group has a pair of longitudinal and a pair of circumferential slots intersecting each other with each slot group being interconnectable with other slot groups through a longitudinal or circumferential slot which extends to the adjacent slot group. The connecting longitudinal or circumferential slot is capable of receiving therein the field winding after it has filled an adjacent slot group, whether it be concentrically within or without the particular slot group. The wedge means which are insertable into the circumferential slots have arcuate lengths less than or equal to the circumferential width of the longitudinal slots so that those wedge means can be initially inserted at the intersection of the circumferential and longitudinal slots. Additionally, selected longitudinal and/or circumferential slots may be formed radially deeper than the remaining slots for insertion therein of exciter leads which extend to the pole regions of the rotor. By use of the present invention, the dynamoelectric machine's stator portion can be made substantially axially coextensive with the rotor's longitudinally and circumferentially disposed field winding.

BRIEF DESCRIPTION OF THE DRAWINGS

The invention will be more fully understood from the following detailed description of a preferred embodiment, taken in connection with the accompanying drawings in which.

DESCRIPTION OF THE PREFERRED EMBODIMENT

The present invention is concerned primarily with rotor construction for supporting the end turns of the field windings in dynamoelectric machines. Accordingly, in the description which follows, the invention is shown embodied in a large turbine generator. It should be understood, however, that the invention may be utilized for integrally supporting field winding end turns in the rotor for any dynamoelectric machine.

Figure 1A:
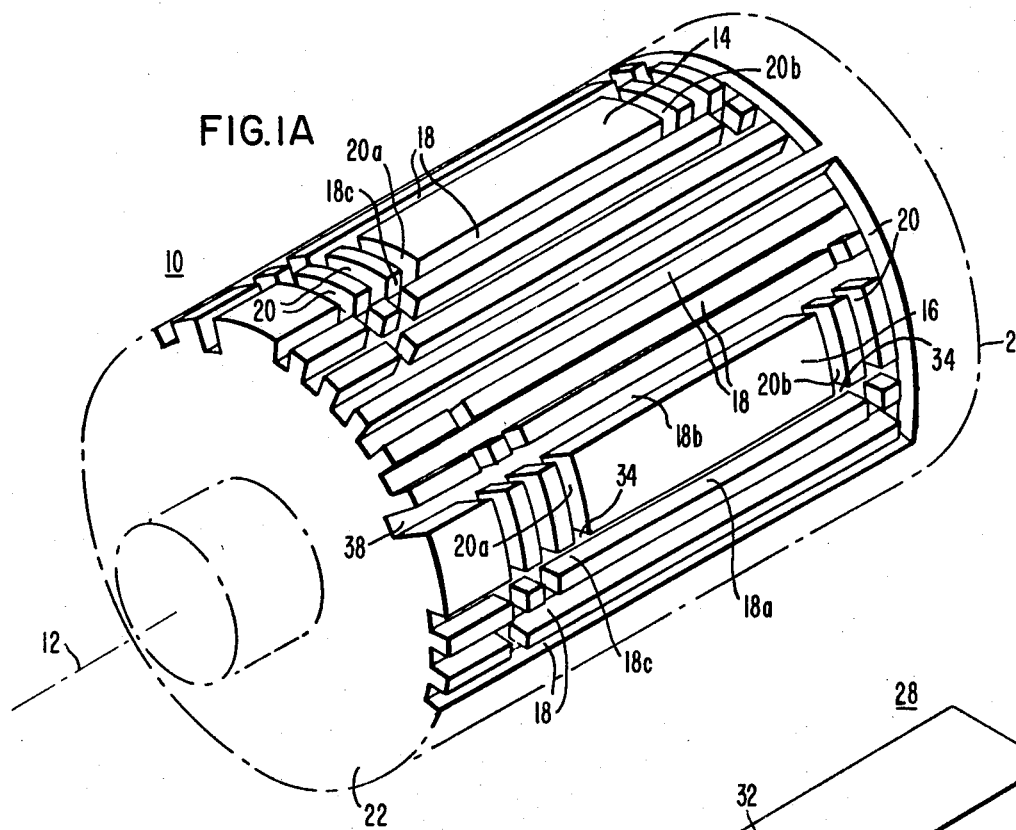
FIG. 1A and 1B are, respectively, perspective views of an exemplary generator rotor in which the invention is incorporated and a wedge structure for restraining coils within rotor slots.

FIG. 1 illustrates the preferred construction of rotor 10 which, when disposed in operating position within a stator can produce a series of rotatable magnetic fields. Rotor 10, during operation, rotates about axis 12. Two pole regions of rotor 10, 14 and 16, are illustrated, but it is to be understood that the present invention is not limited to two pole regions per rotor. Longitudinal and circumferential slots 18 and 20, respectively, are grouped into sets around the pole regions. Each set of longitudinal slots 18 and intersecting circumferential slots 20 surround each of the pole regions 14 and 16 in a substantially concentric configuration when viewed from a radially displaced vantage point. Longitudinal slots 18 extend from axial end 22 of rotor 10 to an intersecting circumferential slot 20 situated between axial end 24 of rotor 10 and pole region 14 or 16.

The field winding (not shown) for rotor 10 is disposed in slots 18 and 20 with the winding typically beginning in the slots adjacent pole regions 14 and 16. Initial distribution of the field winding is usually in the group of slots, both longitudinal and circumferential, which are the concentrically innermost group of intersecting slots. Conductors which make up the field winding are thus arranged in each slot group by sequentially distributing them along a first axial direction in a first longitudinal slot such as 18a, a first circumferential slot such as 20b, a second longitudinal slot such as 18b in a second axial direction, and a second circumferential slot such as 20a before the winding conductors are returned to the initial point of distribution in longitudinal slot 18a. It is to be noted that for purposes of this invention the beginning point for winding each slot group may be in either circumferential or longitudinal slot in that slot group. Upon disposal of the desired number of field winding conductors in the innermost concentric slot group, the winding is then distributed through interslot connecting path 18c to an adjacent slot group. The field winding conductors are then successively disposed in the adjacent slot group such as the outer adjacent longitudinal-circumferential slot group until each slot group is progressively filled and the winding for that pole region is completed. Interslot connector path 18c is, preferably, a portion of longitudinal slot 18.

Figure 1B:
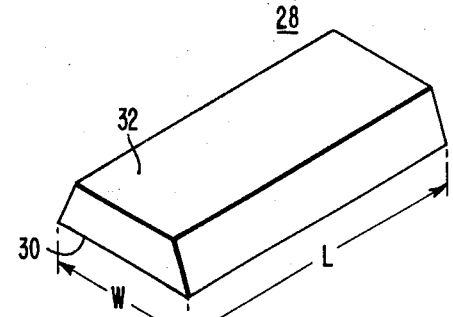
Figure 1C:
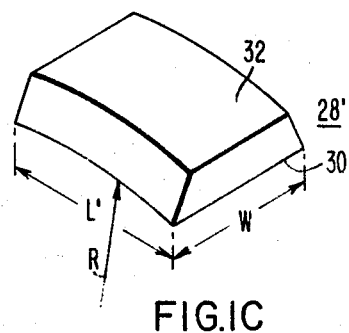

After distribution of the field winding in longitudinal and circumferential slots 18 and 20, respectively, about pole regions such as illustrated regions 14 and 16, wedge members are inserted across the mouth of slots 18 and 20 to restrain the windings in those slots during high speed rotation of rotor 10. A typical wedge 28 is illustrated in FIG. 1B where it may be seen that wide portion 30 of wedge 28 is arranged to be below the outside surface of rotor 10 and narrow portion 32 of wedge 28 is arranged to be substantially radially coextensive with the radially outer periphery of rotor 10. The cross sectional shapes of slots 18 and 20 are tapered so as to cooperate with the wedges assembled therein and restrain their radial movement. Wedges 28' for circumferential slots 18 are inserted therein by initially disposing wedges 28 in locations 34 where longitudinal slots 18 and circumferential slots 20 intersect. Wedges 28' are then slidably assembled in the circumferential slots 18 by mechanical force or other displacing means. When the mouth of circumferential slots 20 have been closed by wedges 28', longitudinal wedges may be inserted in longitudinal slots 18 from axial end 22 of rotor 10. Wedges 28' which are disposable in circumferential slots 20 are illustrated in FIG. 1C. Wedges 28' have a radius of curvature R whose magnitude is related to the outside diameter of rotor 10 and an arcuate length L' which is less than or equal to the circumferential width of longitudinal slots 18. In other respects, longitudinal wedges 28 are similar to circumferentially disposed wedges 28'. Longitudinal slots 18 may, if desired, be extended to axial end 24 of rotor 10 but such extension thereof can increase the manufacturing required and thus the cost of producing embedded end turn rotor 10.

Figure 2:
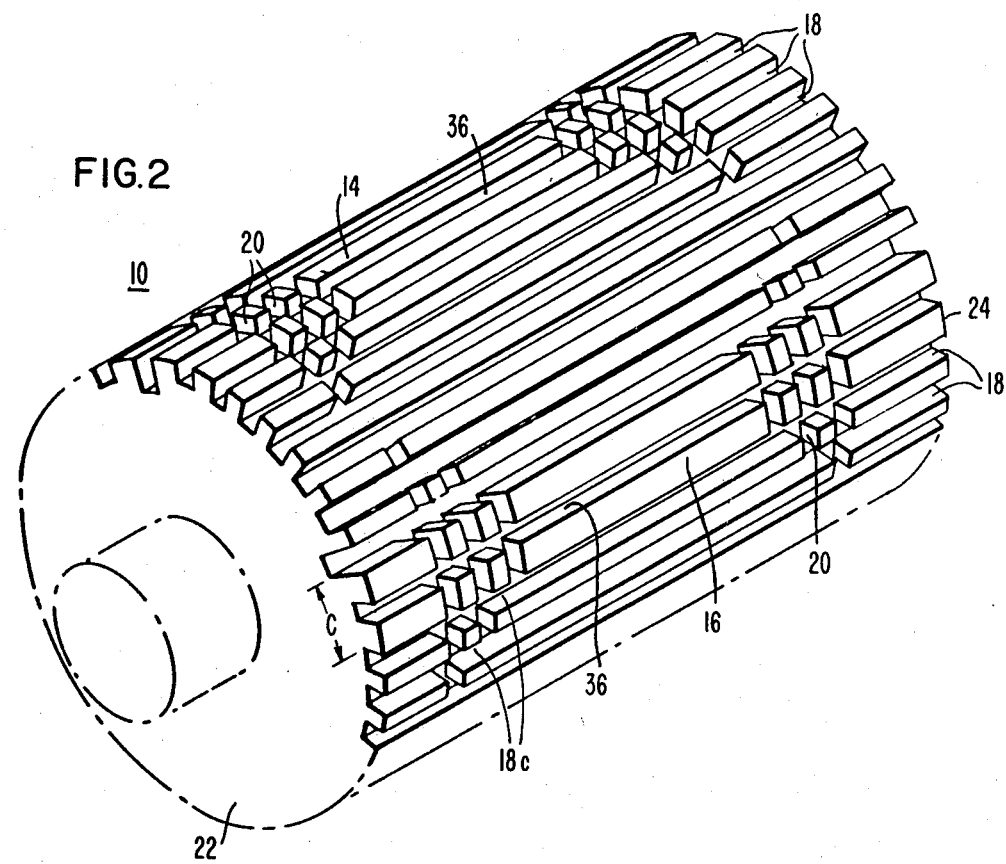
FIG. 2 is a perspective view of an exemplary generator rotor in which an alternate embodiment of the invention is incorporated.

FIG. 2 illustrates an alternate embodiment also having embedded end turns. In this alternate embodiment, longitudinal slots 18 are caused to extend the entire axial distance of rotor 10 from axial end 22 to axial end 24 and, in so doing, intersect circumferential slots 20. On both axial ends of pole regions 14 and 16, the field winding is distributed in longitudinal slots 18 and circumferential slots 20 in substantially the same manner as it was in FIG. 1A. The field winding so distributed, is restrained within the circumferential and longitudinal slots 20 and 18, respectively by longitudinal wedges 28 which are arranged in longitudinal slots 18 throughout the axial length of rotor 10 between axial ends 22 and 24. Auxiliary longitudinal slot 36 is also formed across the faces of pole regions 14 and 16 to provide support for the winding portions situated in circumferential slots 18 and having a circumferential span of C. Wedges 28 are inserted in auxiliary longitudinal slots 36 to aid in the support of the field winding portion situated in span C which is ordinarily too extensive to remain unsupported during high-speed rotation of rotor 10. Interslot connection paths 18c remain very similar to those illustrated in FIG. 1A. The embodiment shown in FIG. 2 requires no circumferential wedges and relies upon circumferentially-spaced longitudinal wedges 28 to provide sufficient support to the circumferentially-disposed field winding embedded end turns.

Figure 3:
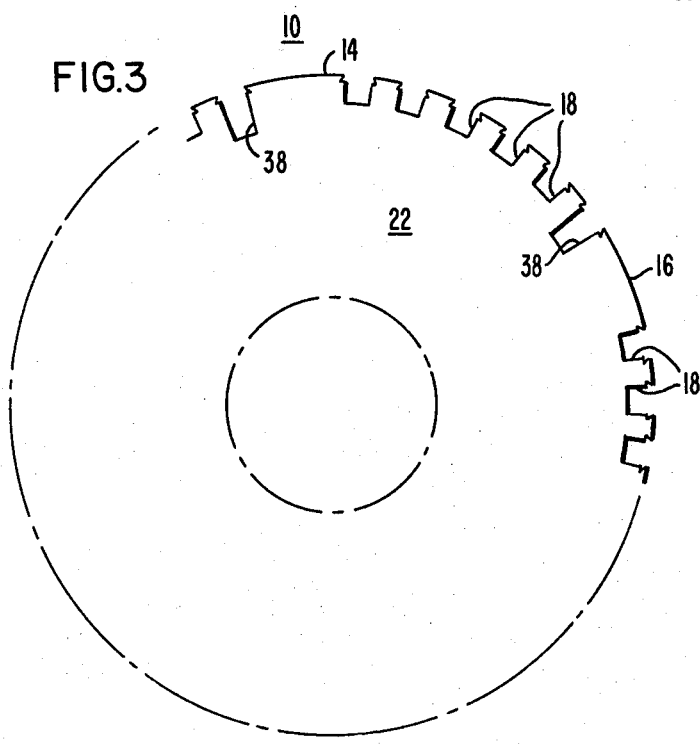
FIG. 3 is an axial elevation view of the generator rotor illustrated in FIGS. 1A and 2.

FIG. 3 illustrates axial end 22 of rotor 10 in which longitudinal slots 18 are shown formed on both circumferential sides of pole regions 14 and 16. FIG. 3 illustrates four poles on rotor 10, but it is to be understood that any even number of poles could be utilized on such embedded end turn rotor. Also shown in FIG. 3 are master longitudinal slots 38 in which the rotor's field winding is disposed similarly to longitudinal slots 18, but master longitudinal slots 38 are formed radially deeper so as to provide a conduit for disposing exciter leads along the radially inner boundary thereof. Exciter leads are thus introduced to pole regions 14 and 16 through master longitudinal slots 38 and provide the beginning of the field winding which is subsequently wound about those pole regions. It is to be understood that exciter leads disposed in master longitudinal slots 38 are separated from the field winding by additional supporting wedges 28 which secure the exciter leads in position. It is to be further understood that interslot connection paths 34 may be part of longitudinal slots 18 or master longitudinal slots 38, or circumferential slots 20.

Figure 4A:
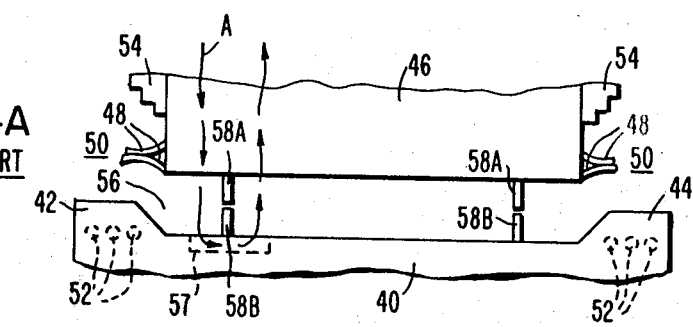
FIGS. 4A and B are schematic illustrations of a prior art rotor and stator combination and the present invention's rotor and stator combination respectively.
Figure 4B:
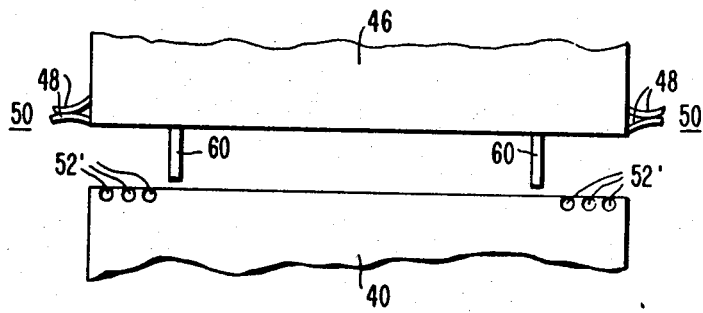

FIGS. 4A and 4B schematically illustrate cooperating rotor and stator portions from prior art and the present invention, respectively. Prior art rotor 40 is seen in FIG. 4A to include on its axial ends retaining rings 42 and 44 which are commonly utilized to restrain the field winding end turns during high speed rotor rotation. Stator 46 which surrounds rotor 40 can be seen to extend between the axially adjacent ends of retaining rings 42 and 44. Conductors 48 disposed in longitudinal slots formed in stator 46 are joined to other conductors 48 similarly disposed in other longitudinal slots at each axial end of the stator to form end turns 50 which protrude beyond each axial end of the stator 46 and are radially adjacent retaining rings 42 and 44. End turns 52 of the rotor's field winding are illustrated as being restrained by retaining rings 42 and 44.

Magnetic flux levels on each axial end of the generator illustrated in FIG. 4A are so extensive that end shields 54 are installed at each axial end of stator 46 to reduce the flux levels entering the generator's stator 46 and thus prevent excessive stator heating which could otherwise occur. Additional undesirable effects of magnetic flux on the various generator parts include interaction of rotor and stator currents which can produce large radial forces on the stator's end turns 50 and other associated magnetic materials in the end regions.

Generators whose construction is similar to that shown in FIG. 4A are often cooled by forcing hydrogen or other coolant radially through the stator 46, air gap 56, into rotor 40, axially down the rotor along an inner opening 57, and radially return through rotor 40, stator 46, and intervening air gap 56. To provide effective cooling and avoid extreme elevation of the coolant temperature, it is sometimes necessary to use several of the aforementioned radial coolant circuits. Arrows A in FIG. 4A illustrate an exemplary coolant path through stator 46, air gap 56, inner opening 57, and rotor 40. To promote coolant flow radially into rotor 40 and axially down within the inner rotor opening 57 air gap baffles 58a and 58b are disposed across air gap 56. Since conventional generator assembly techniques dictate that rotor 40 be inserted axially through an assembled stator 46, there can be no radial protrusion into the air gap 56 which would inhibit assembly of rotor 40. For such reason, the air gap baffle on conventional generators is formed in two pieces, 58a and 58b which are attached to stator 46 and rotor 40, respectively. Air gap baffle portion 58a extends radially inward from stator 46 but remains radially outside retaining rings 42 and 44, thus necessitating disposal of air gap baffle portion 58b attached to rotor 40 which cooperates with air gap baffle portion 58a in substantially eliminating axial flow of coolant through air gap 56. Assembly of air gap baffle portion 58b on rotor 40 is, however, undesirable since its radial extension may be substantial and thus be susceptible to high stresses developed therein as a result of centrifugal forces produced by high speed rotor 40 rotation.

FIG. 4B illustrates a proposed generator construction which is made possible by eliminating retaining rings 42 and 44. Embedded end turns 52' are shown on each axial end of rotor 40. As can be seen, the retaining rings utilized on conventional generators have been eliminated due to the wedged construction retaining means illustrated in FIGS. 1 and 2. Stator 46 has been axially lengthened and rotor 40 has been axially shortened from the conventional generator construction of FIG. 4A. The new construction shown in FIG. 4B permits use of end turn rotor flux to augment longitudinal rotor flux for generating electricity in stator conductors 48. It can be shown that useful, voltage producing flux from end turns 52" is approximately 50% of that produced across the air gap by longitudinal conductors on the rotor 40. Utilizing such end turn flux permits a decrease in the length of rotor 40, a decrease in the mean turn length of the field winding of as much as 10%, and a decrease in the required exciter rating while maintaining the same generator rating. Utilizing rotor and stator structures which are substantially coaxial may reduce the need for costly axial end shields used on conventional generators for reducing heating losses in the stator. Additionally, since the field winding on rotor 40 does not extend axially beyond the stator 46, radial forces acting on the stator's end turns 50 may be substantially reduced along with much of the bracing and reinforcement normally required for such end turns 50.

The rotor construction utilizing embedded end turns has no radially enlarged portions such as the retaining rings which were in common use on prior art generators. A rotor of such constant outside diameter permits use of air gap baffles 60 which are attachable to stator 46 in their entirety thus eliminating the high stresses which are inherent in the prior art's attachment of air gap baffle portion 58b to rotor 40 during its rotation. The greatest advantage, however, of the present invention is the increase in physical size and thus rating of generators which can be realized by eliminating rotor end turn retaining rings and utilizing wedged securing devices in association with embedded end turns 52'.

It will now be apparent that an improved dynamoelectric machine has been provided which has decreased excitation requirements, eliminates the need for axial end flux shields for the stator, permits increases in the rotor diameter and thus rating of generators, allows use of stationary air gap baffles, and further increases the generator rating for a given set of hardware by utilizing field winding end turn fluxes to produce additional voltage in the stator windings. Such dynamoelectric machine construction is made possible by utilizing embedded end turns and wedged securing means therefor.

What is claimed is:
1. A dynamoelectric machine comprising:
a rotor having radially directed longitudinal slots and circumferential slots of predetermined axial length and arc length respectively, each of said longitudinal slots intersecting at least one circumferential slot on each axial end region of the rotor, said intersecting circumferential and longitudinal slots being grouped into sets with each set being disposed about a pole region of said rotor;

a field winding disposed in said slots, said winding having end turn portions which are arranged in said circumferential slots; and wedge means for retaining said winding within said slots, and wedge means being slidably insertable into selected slots, said wedge means which are insertable in said circumferential slots having arcuate lengths less than or equal to the circumferential width of said longitudinal slots.

2. The dynamoelectric machine of claim 1 wherein said longitudinal slots extend from a first axial end of said rotor to circumferential slots situated between the second axial end of the rotor and the pole regions.

3. The dynamoelectric machine of claim 2 wherein pairs of longitudinal slots in each pole region set cooperate with pairs of circumferential slots intersecting therewith to form a concentric series of intersecting longitudinal-circumferential slot groups surrounding each pole region, the rotor surface area bounded by said groups increasing in size as the cooperating circumferential slot pairs and longitudinal slot pairs are increasingly axially separated and increasingly circumferentially separated respectively.

4. The dynamoelectric machine of claim 3 wherein selected longitudinal slots, at said first axial end, provide interslot crossover connection paths for distribution of said winding between slot groups.

5. The dynamoelectric machine of claim 3 wherein predetermined longitudinal slots provide paths for introducing electrical exciter leads to the pole regions of the rotor.

6. The dynamoelectric machine of claim 1 wherein said longitudinal slots extend substantially the entire length of said rotor.

7. The dynamoelectric machine of claim 6 wherein selected longitudinal slots provide interslot crossover connection paths for distribution of said winding between adjacent circumferential slots and the longitudinal slots intersecting therewith.

8. The dynamoelectric machine of claim 6 wherein predetermined longitudinal slots provide paths for introducing electrical exciter leads to the pole regions of the rotor.

9. The dynamoelectric machine of claim 6, further comprising:

at least one auxiliary longitudinal slot passing between the longitudinal slots adjacent each pole region and extending substantially the entire length of the rotor, said auxiliary longitudinal slot passing over said pole region; and auxiliary wedge means disposed in said auxiliary longitudinal slot for retaining said winding within the circumferential slot portions which are circumferentially bound by the longitudinal slots adjacent the pole regions.

10. The dynamoelectric machine of claim 1, further comprising:

a stator portion disposed about said rotor, said stator portion being substantially axially coextensive with the circumferential slots nearest each axial end of the rotor.

11. The dynamoelectric machine of claim 1, wherein said wedge means are highly conductive, electrically connected and adapted to minimize induced current flow in the rotor.

* * * * *